United States Patent [19]

Davis et al.

[11] Patent Number: 5,652,771

[45] Date of Patent: Jul. 29, 1997

[54] TIME TRACKING BASED ON A TAYLOR SERIES OF AN EXPECTED SIGNAL

[75] Inventors: Mark Davis, Carlsbad; Michael Parr, San Diego, both of Calif.

[73] Assignee: Hughes Electronics, Los Angeles, Calif.

[21] Appl. No.: 368,529

[22] Filed: Jan. 4, 1995

[51] Int. Cl.⁶ .................................................. H04L 7/06
[52] U.S. Cl. ........................ 375/364; 375/366; 375/368; 370/509; 370/514; 348/536
[58] Field of Search ................ 370/100.1, 104.1, 370/105.1, 108, 503, 509–514; 375/324, 342, 343, 344, 354, 355, 362, 365, 368, 364; 348/500, 525, 528, 533, 536, 537

[56] References Cited

U.S. PATENT DOCUMENTS 5,299,236  3/1994  Pandula ................................. 375/368
5,479,451  12/1995 Eldering et al. ....................... 375/355
5,528,634  6/1996  Griph et al. ........................... 375/355

Primary Examiner—Stephen Chin
Assistant Examiner—Amanda T. Le
Attorney, Agent, or Firm—John T. Whelan; Wanda Denson-Low

[57] ABSTRACT

A system and method for determining a timing error of an incoming signal, in one embodiment, receives the incoming signal into a receiver, and locates a known portion within a time frame of the incoming signal. The known portion is compared with a stored representation of the known portion, and with a stored representation of a derivative of the known portion. The timing error of the incoming signal is determined with respect to the clock signal based on the comparing of the known portion with the stored representations, and a subsequent known portion is located within a subsequent time frame of the incoming signal based on the timing error.

15 Claims, 2 Drawing Sheets

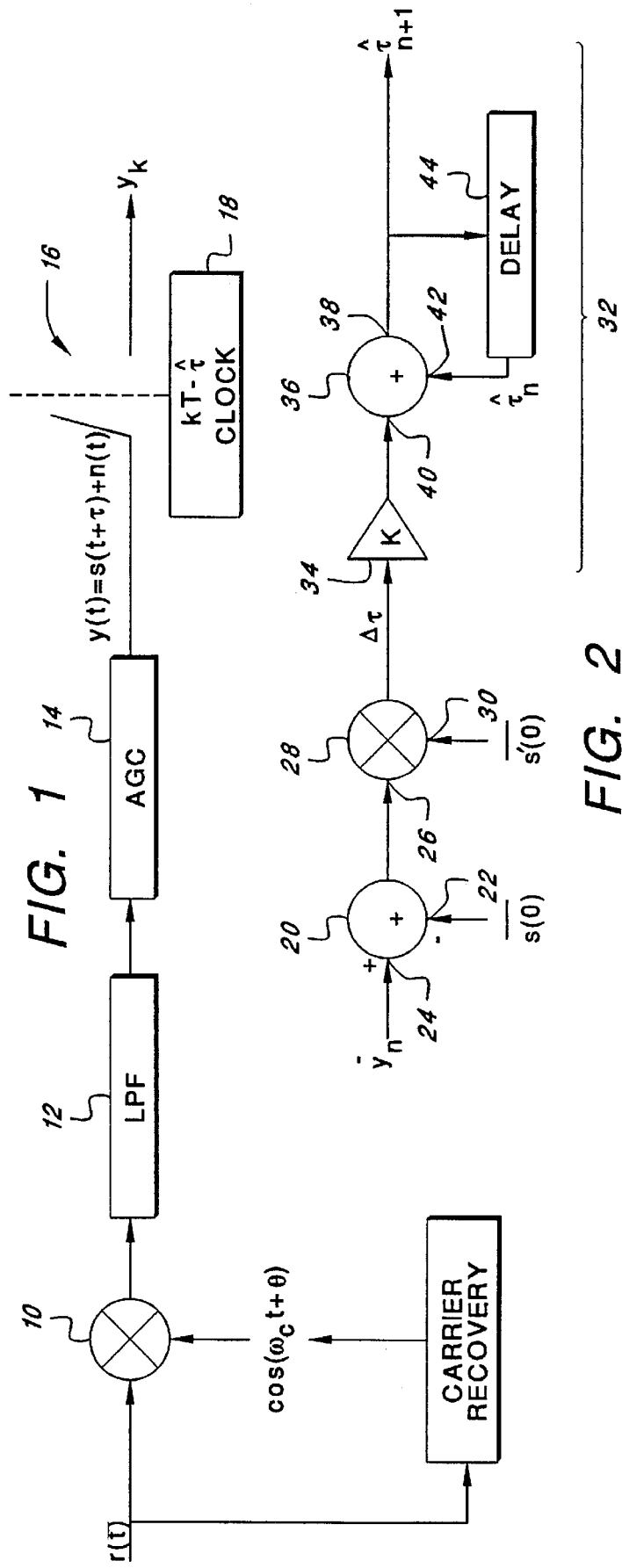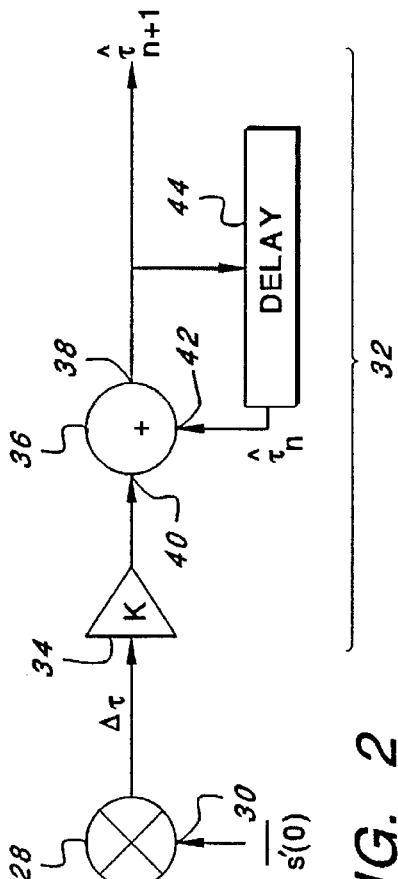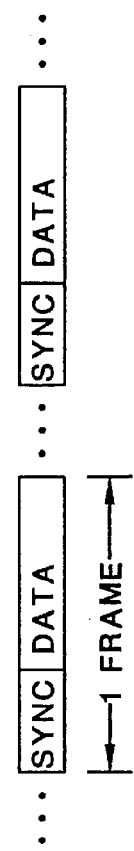

TIME TRACKING BASED ON A TAYLOR SERIES OF AN EXPECTED SIGNAL

BACKGROUND OF THE INVENTION

The present invention relates time tracking in a communications system, and more particularly to time tracking in a synchronous communications system. Even more particularly, the present invention relates to determining a timing error, or clock phase error, of a clock signal based on a comparison between an incoming signal and a Taylor series of an expected signal.

A great deal has been published in the area of symbol time tracking. Namely, schemes employing early and late samples, oversampling, and interpolation have been used to adjust a timing error, or clock phase error, in a clock circuit at a receiver. The need for such symbol time tracking schemes arises due to the fact that incoming radio frequency signals may be slightly delayed or advanced as a result of distortions that occur within a communications channel between a transmitter and the receiver, of relative physical movement between the transmitter and the receiver, or of clock frequency mismatch between the transmitter and the receiver. As a result of such distortions, the clock circuit within the receiver must be adjusted so that it accurately tracks the timing of the incoming radio frequency signal. Systems and methods are therefore needed in order to make timing adjustments to the clock circuit so as to account for these distortions.

One approach to making these timing adjustments to the clock circuit utilizes three sets of samples that are taken from the incoming radio frequency signal. The first of these sets of samples is taken early, i.e., before the clock circuit indicates that such samples should be taken. A second set of such samples is taken on time, i.e., when the clock circuit indicates that such samples should be taken. And, a third set of samples are taken late, i.e., after the clock circuit indicates that such samples should be taken. After the three sets of samples are taken from the radio frequency signal, a comparison is made between a portion of each of the sets of samples, which is taken during a synch pattern portion of the incoming signal, and a representation of what these samples are expected to be. The synch pattern portion of the incoming signal contains a known pattern of information, and therefore should match the expected set of samples, after account is made for attenuation that occurs within the communications channel.

Based on the comparison, when the on time set of samples is highly correlated with the expected set of samples, the clock circuit is accurately tracking the incoming radio frequency signal. However, in the event the early set of samples is better correlated with the expected samples, a positive timing offset, or phase shift, is applied to the clock signal generated by the clock circuit so as to advance the timing of the clock signal. Similarly, in the event the late set of samples better correlates with the expected set of samples, a negative timing offset, or phase shift, is applied to the clock signal generated by the clock circuit so as to retard the timing of the clock signal. Thus, a timing offset adjustment is made to the clock signal, whenever the expected set of samples better correlates with the early or late set of samples. As a result, the clock signal will more accurately track the incoming radio frequency signal over time.

Early-late-type symbol time tracking provides for good adjustment of the clock signal based on variations in timing in the radio frequency signal. Unfortunately however, this approach requires that three sets of samples be taken from the radio frequency signal and that three separate correlations (comparisons) be performed between each of the sets of samples taken from the radio frequency signal and the expected set of samples. This additional sampling and correlating requires increased processing time and overhead at the receiver and limits the selection of prefabricated receiver hardware from which the receiver can be fabricated to that hardware which permits acquisition of the three sets of samples. Problematically, not all commercially available prefabricated receiver hardware makes available both on time samples and early and late samples. Therefore, improvements are needed in systems and methods for symbol time tracking in receivers.

Another approach to symbol time tracking utilizes oversampling, which involves sampling at a much higher rate than is needed for accurate symbol acquisition, i.e., a much higher rate than the Nyquist rate. Correlation techniques similar to those employed with early-late schemes are employed in oversampling schemes in order to select which of the several sets of samples provides the most appropriate representation of the incoming radio frequency signal.

A further approach to symbol time tracking is to sample the incoming radio frequency signal at the Nyquist rate and then to interpolate so as to generate off time samples, analogous to early and late samples. The interpolation approach thus involves not only performing correlations between the expected samples, and the interpolated samples but requires that the interpolated samples be generated.

An even further approach to symbol time tracking can be used when raw samples are passed through a filter, e.g., a matched filter, before symbol time tracking is performed. In this approach, time-offset reversions of the filter are used to generate early and late filtered samples from the raw samples. Unfortunately, this approach requires multiple filtering operations followed by the three sets of correlations required in the early-late symbol time tracking approach, described above.

Thus, the oversampling, interpolation, and filtered approaches to symbol time tracking suffer from the problems associated with the above-described early-late symbol time tracking scheme, namely, they require that additional samples be taken and/or that additional computations be performed. Thus, improvements are needed in systems and methods for symbol time tracking within a receiver.

The present invention advantageously addresses the above and other needs.

SUMMARY OF THE INVENTION

The present invention advantageously addresses the needs above as well as other needs by providing a system, and method for determining a timing offset, or phase error, of a clock signal based on a comparison between an incoming signal and a Taylor series of an expected signal.

In one embodiment, the invention can be characterized as a method of determining the timing offset of the incoming signal. The method includes the steps of receiving the incoming signal into the receiver, and locating a known portion of the incoming signal within a time frame of the incoming signal in response to a clock signal generated within the receiver. The method further includes comparing the known portion with a stored representation of the known portion, and with a stored representation of a derivative of the known portion. These two comparisons can be characterized as comparing the known portion with a first order Taylor series. In one variation of this embodiment, the first of these two comparisons may be a subtraction and the second may be a multiplication. Numerous other types of comparisons may be conducted in other variations of this embodiment. In other embodiments, a higher order Taylor series may be compared with the known portion, e.g., the representation of the known portion and representations of first and second derivatives of the known portion may be compared with the known portion. Next, the method includes determining the timing error of the incoming signal with respect to the clock signal in response to the comparing, and locating a subsequent known portion within a subsequent time frame of the incoming signal in response to the clock signal and the determined timing error. In this way, adjustment is made to the time relationship between the clock signal and the incoming signal so as to account for variations in timing that may occur in the incoming signal and/or clock signal.

In another embodiment, the invention can be characterized as a system comprising a clock circuit that generates a clock signal, and a receiver that receives an incoming signal with an unknown timing error relative to the clock signal. The incoming signal is divided into time frames, and each time frame includes a known portion. The system further includes coarse acquisition means for locating the known portion within a time frame in response to the clock signal, memory means, such as a read only memory (ROM), for storing a representation of the known portion, and for storing a representation of a derivative of the known portion, and processor means for comparing the known portion with the representation of the known portion, and for comparing the known portion with the representation of a derivative of the known portion. The system also further includes determining means for determining the timing offset of the incoming signal with respect to the clock signal, and clock adjusting means for locating a subsequent known portion within a subsequent time frame of the incoming signal in response to the clock signal and in response to the timing error.

BRIEF DESCRIPTION OF THE DRAWINGS

The above and other aspects, features and advantages of the present invention will be more apparent from the following more particular description thereof, presented in conjunction with the following drawings wherein:

FIG. 1 is a block diagram of an acquisition circuit for generating samples of an incoming signal;

FIG. 2 is a block diagram of a time offset determination circuit used in combination with the acquisition circuit of FIG. 1 for determining a timing error of the incoming signal relative to a clock signal;

FIG. 4 is a representation of time frames of the incoming signal that are processed by the circuits of FIGS. 1 and 2.

Corresponding reference characters indicate corresponding components throughout the several views of the drawings.

DETAILED DESCRIPTION OF THE INVENTION

Figure 3:
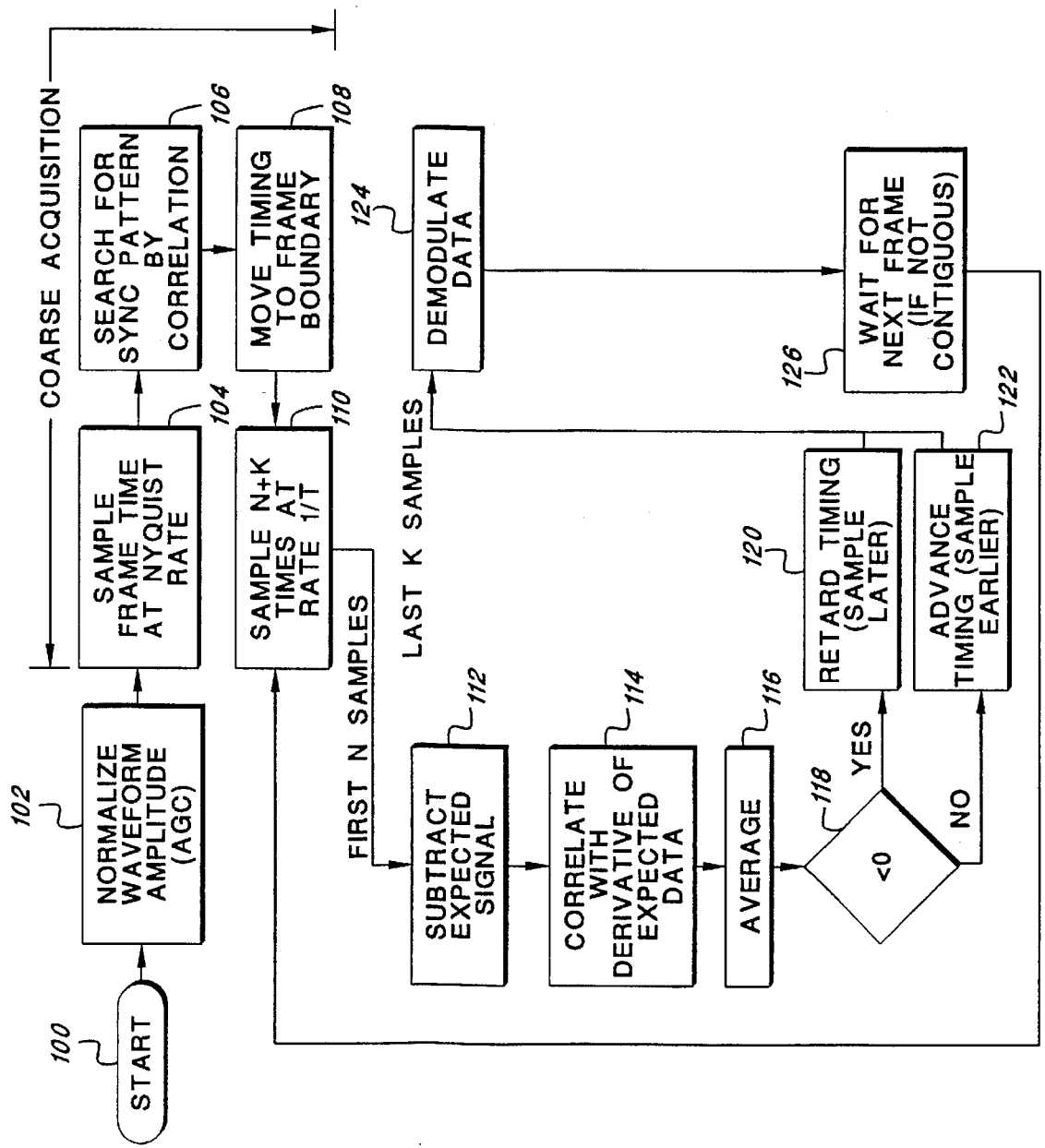
FIG. 3 is flow chart showing the steps traversed by the circuits of FIGS. 1 and 2 in accordance with one embodiment of the invention in order to determine the timing error of the incoming signal.

The following description of the presently contemplated best mode of practicing the invention is not to be taken in a limiting sense, but is made merely for the purpose of describing the general principles of the invention. The scope of the invention should be determined with reference to the claims.

The invention is useful in a system in which a signal passes from a transmitter through a communications channel and arrives at a receiver with an unknown time-varying delay introduced into the incoming signal by the communications channel. The incoming signal consists of a known portion (or synch pattern) and an unknown portion. For example, the signal may be a digital signal divided into time frames, such as is illustrated in FIG. 4, having a known synchronization, or synch, pattern that precedes (or succeeds) an unknown data portion within each time frame. The time frames may be contiguous or may be discontiguous. Note that coarse acquisition of the locations of the known portion (or synch pattern) within the incoming signal is performed by heretofore known techniques, which, as mentioned below, are well known in the art.

The invention determines a timing error, or clock phase error, of the signal, e.g., during a particular time frame. In one embodiment, this determination is made by making two comparisons: comparing (or correlating) the known portion of the signal as received into the receiver (referred to as the received known portion, or received synch pattern) to the known portion of the signal that was expected (referred to as the expected known portion, or expected synch pattern); and comparing the known portion of the signal that is received into the receiver to the derivative of the known portion of the signal that was expected (expected derivative). Both the expected known portion and the expected derivative can be stored in a memory, such as a read only memory (ROM), and are constant. Thus, the only input needed by the invention is the received known portion of the signal. The expected known portion and the expected derivative, together form a first order Taylor series. A higher order Taylor series may be used requiring that additional comparisons be performed. Use of the first order Taylor series is however, preferred and is assumed in the discussion that follows.

Based on the first comparison, a determination is made as to whether the amplitude of the received known portion has been attenuated by the communications channel, and the received known portion is scaled (or amplified) so as to account for such attenuation. Based on the second comparison, which is made using the received known portion having been scaled, a determination of the timing error, or clock phase error, is made.

Advantageously, the above-described embodiment of the invention requires only one set of sparsely spaced samples within the known portion of the incoming signal in order to determine the timing error-unlike heretofore known techniques for determining the timing error, which require that either additional samples of the signal are taken or that approximations of such samples be calculated, both of which require additional processing.

The invention is widely applicable to communications systems, and digital communications systems in particular. The invention is applicable in any system in which a known synchronization pattern is periodically transmitted through a communications channel to a receiver. In a cellular telecommunications system, for example, the communications channel will typically include air, but it should be understood that the present invention may be applied to systems wherein the communications channel includes any known medium for transmitting communication signals, e.g., wire pairs, coaxial cable, wave guides, fiber optical cable and the like. Timing variations in the incoming signal must be slow enough that the synch patterns within the signal can be tracked. Specifically, there should be an insignificant time variation within the synch patterns, and variations in timing between synch patterns should be small. The amount of timing variation between synch patterns that is acceptable will depend on many known factors that are a function of the particular application in which the invention is utilized.

Referring to FIG. 1, a coherent binary phase-shift keying-type system (BPSK system) is shown of one embodiment of the invention. Variations in timing offset are determined using the teachings of the present invention as follows. A radio frequency signal r(t) is received into the system using an appropriate antenna (not shown) as is known in the art. The antenna passes the radio frequency signal r(t) into a multiplier 10 (i.e., muliplexer or down converter) that converts the radio frequency signal to a baseband waveform by multiplying the radio frequency signal by a carrier frequency cos ($\omega_c t+\theta$), as is known in the art. This may also be accomplished by quadrature downconversion followed by carrier phase tracking in the complex plane. The baseband waveform is filtered using a anti-aliasing low-pass filter 12, as is known in the art, and is then amplified so as to normalize its amplitude using an automatic gain controlled amplifier 14, as is also known in the art. A coherent downconverted baseband (i.e., demodulated) waveform y(t) generated by the automatic gain controlled amplifier consists of a signal s(t) and additive white Gaussian noise (AWGN) and/or other forms of noise n(t):

$$y(t)=s(t+\tau(t))+n(t)$$

The coherent downconverted baseband waveform signal is then sampled using, e.g., an analog-to-digital converter 16 with a sampling period T. Samples $y_k$ are generated by the analog-to-digital converter in response to such sampling. The sampling period for a cellular telephone-type communications system, for example, could be about one or two periods per symbol. Timing for such sampling is initially based on coarse acquisition of the location of a synch pattern within time frames of the incoming signal, i.e., the radio frequency signal. Such coarse acquisition is known in the art and is therefore not described herein in detail.

As the analog-to-digital converter 16 samples the coherent downconverted baseband signal, fine adjustments are made to the time at which the sampling occurs in order to account for clock phase error or timing error, that occurs between the waveform y(t) and the clock signal generated by the clock circuit in the receiver. Thus, sampling occurs periodically at $t=kT-\hat{\tau}(t)$, wherein k is a sample number 0, 1, 2, 3, ...; T is the sampling interval, mentioned above; and $\hat{\tau}(t)$ is an estimated timing offset generated as described below, as a function of time t. The timing $kT+\hat{\tau}(t)$ of the sampling is controlled by a clock circuit 18, such as are commonly used in the art, which is periodically adjusted as $\hat{\tau}(t)$ is adjusted. The initial coarse acquisition determines $\hat{\tau}(0)$.

Several assumptions are made in the analysis that follows, which for a cellular telephone-type communications system are reasonable assumptions. First, approximately every $T_{synch}$ seconds following the initial acquisition of the synch pattern, it is assumed that there is another synch pattern. Second, at t=0, $\tau(t)$ is assumed to be less than a maximum timing variation $\epsilon$, so as to model coarse acquisition operation, which is assumed to have been performed previously. Third, after t=0, the actual timing offset $\tau(t)$ is sufficiently small that it can be tracked by adjusting the clock signal phase or estimated timing offset $\hat{\tau}(t)$ once every $T_{synch}$ seconds. Fourth, the goal of the sampler (analog-to-digital converter) is to form the samples d(kT), which implies that the estimated timing offset $\hat{\tau}(t)$ is very close to the actual timing offset $\tau(t)$. In the event the estimated timing offset $\hat{\tau}(t)$ is equal to the actual timing offset $\tau(t)$, then the sampler will generate the perfectly timed samples d(kT).

Referring next to FIG. 2, the samples $y_k$ taken during the nth synch pattern are denoted as $\bar{y}_n$. A vector representation of the expected signal $\bar{s}(\tau)$ is defined as $|s(\tau), s(T+\tau), \ldots, s((N-1)T+\tau)|^T$, such that $\bar{s}(0)$ is a set of expected samples in the known synch pattern. Another vector $\bar{s}'(\tau)$, which is a vector of expected derivatives of the signal $\bar{s}(\tau)$, is defined as:

$$\frac{d\bar{s}(\tau)}{d\tau} = \bar{s}'(\tau) = |s'(\tau), s'(T+\tau), \ldots, s'((N-1)T+\tau)|^T.$$

In FIG. 2, a tracking circuit is shown in accordance with an embodiment of the present invention. During each synch pattern, the samples of the expected synch vector $\bar{s}(0)$ are subtracted from the synch pattern portion $\bar{y}_n$ of the samples $y_k$ generated by the sampler. This subtraction is performed by an adder 20 having a negative input 22 to which the expected synch vector $\bar{s}(0)$ is passed and a positive input 24 to which the synch pattern portion $\bar{y}_n$ is passed. The subtraction is very sensitive to the amplitude and phase of the synch pattern portion $\bar{y}_n$ of the waveform. Thus, the embodiment described herein is best utilized in situations wherein the amplitude and carrier phase of the synch pattern are constant or can be estimated accurately. A sum signal indicative of this subtraction $\bar{y}_n - \bar{s}(0)$ is output from the adder and is passed to one input 26 of a multiplier 28. Another input 30 of the multiplier 28 receives the derivative $\bar{s}'(0)$ of the expected synch pattern $\bar{s}(0)$, and a timing error signal $\Delta_\tau$ indicative of the correlation between the sum signal and the derivative $\bar{s}'(0)$ is generated at an output of the multiplier 28.

The timing error signal $\Delta_{96}$ is filtered so as to achieve an appropriate tradeoff between response time and jitter (as dictated by the system in which the present invention is utilized). In the system shown in FIG. 2, an infinite impulse response (IIR) filter 32 is used to achieve this result. The IIR filter 32 employs an amplifier 34, which multiplies the timing error signal by a gain K; an adder 36 with an output 38 and first and second positive inputs 40, 42; and a delay loop 44 formed between the output 38 of the adder 36 and the second positive input 42. An amplified timing error signal $K\Delta_\tau$ is passed from the amplifier 34 to the adder 36, which adds the estimated timing offset $\hat{\tau}_n$, having been delayed by one time frame, to the amplified timing error signal $K\Delta_\tau$ $K\Delta_\tau$. The adder generates an updated estimated timing offset $\hat{\tau}_{n+1}$ in response to such adding. Thus, the updated estimated timing offset $\hat{\tau}_{n+1}$ is generated by the accumulator and is defined as follows:

$$\hat{\tau}_{n+1} = \hat{\tau}_n + K\Delta_\tau.$$

Note that the tracking circuit of FIG. 2 corresponds to the derivative at $\tau=0$ of a likelihood ratio for the timing $\tau$ based on the sample vector $\bar{y}_n$. Thus, the tracking circuit is based on maximum likelihood sequence estimation, which minimizes jitter and noise.

As mentioned above, the subtraction performed by the circuit of FIG. 2 is highly sensitive to the carrier phase and amplitude of the synch pattern portion $\bar{y}_n$ of the waveform, and that the above-described embodiment is best utilized in situations wherein such phase and amplitude are known or can be estimated accurately. If however the downconversion performed by the system of FIG. 1 is complex, with the radio frequency signal having an unknown carrier phase and amplitude, the samples $y_k$ are given by:

$$y_k = A e^{j\theta} s(\tau) + n(\tau)$$

wherein the amplitude A and carrier phase $\theta$ are unknown. Both the amplitude A and the phase $\theta$ can be estimated from the inner product <ȳ, s(0)>—the angle (carrier phase) being the maximum likelihood phase estimate θ and the amplitude of this signal being the maximum likelihood amplitude estimate Â (having been normalized by the signal magnitude ‖s(0)‖).

Referring next to FIG. 3, a flow chart is shown of the steps traversed in order to carry out the determination of timing error in FIGS. 1 and 2. It will be recognized by one skilled in the art that the teachings herein can be at least partially implemented using a processor, e.g., a digital microprocessor, modified with an appropriate software program. Such a software program could easily be generated by one skilled in the art based on the teachings herein, and in particular based on the flow chart of FIG. 3.

To begin (Block 100), a baseband waveform (generated in response to a downconversion of the incoming communications signal) is normalized (Block 102) in amplitude using the automatic gain controlled amplifier 14 (FIG. 1). The coherent downconverted baseband waveform y(t) is generated by the automatic gain controlled amplifier 14 (FIG. 1) and is frame time sampled (Block 104) at the Nyquist sampling rate. Based on this frame time sampling, a search is conducted (Block 106) for the synch pattern, by correlating the frame time samples with the expected (known) synch pattern. Once the portion of the incoming signal is located in which the synch pattern is found, the clock circuit is synchronized (Block 108) with the incoming signal. The sampling (Block 104), search (Block 106) and synchronization (Block 108) steps are referred to generally as coarse acquisition, and are well known in the art of synchronous communications.

Next, the incoming signal is sampled (Block 110) at a sampling rate 1/T (which is a slower sampling rate than the frame time sampling rate used for coarse acquisition). The timing of the sampling and the sampling rate 1/T are controlled in response to the clock signal generated by a clock circuit (not shown) within the receiver. Such clock circuits are well known in the art. For the first N samples, which are defined as occurring during the synch pattern of the incoming signal, the expected samples of the synch pattern are compared (Block 112) to the received synch pattern by subtracting the expected synch pattern from the received synch pattern. Next, the result of the subtraction is correlated (Block 114) with the derivative of the expected synch pattern, and the result of the correlation is filtered (Block 116) using the infinite impulse response (IIR) filter. If the correlation is less than zero (Block 118), sampling is too early so the clock signal is retarded (Block 120), i.e., delayed, because the synch pattern indicates that the timing error, or phase error, is positive. If the correlation is greater than zero (Block 118), sampling is too late so the clock signal is advanced (Block 122), because the synch pattern indicates that the timing error, or phase error, is negative.

Following the synch pattern, i.e., the first N samples, are the information-containing, or data, samples, i.e., the next K sample A, which are demodulated (Block 124) and processed as is known in the art. Following the demodulation and processing of the information-containing samples, the embodiment of FIG. 3 waits (Block 126) for the arrival of the next time frame, if the time frames are not contiguous. When the next time frame arrives, the synch pattern within it is sampled (Block 110) and the subtraction (Block 112), correlation (Block 114), and filtering (Block 116) are again performed. This processes is repeated for each frame of the incoming signal. In this way, the timing error, or clock phase error, is determined and the clock signal is adjusted without the need for additional sets of samples from the incoming signal to be taken or estimated. The above-described system and process reduce the amount of processing required by performing only one subtraction and one correlation, as opposed to the three or more correlations required by heretofore known systems and methods.

While the invention herein disclosed has been described by means of specific embodiments and applications thereof, numerous modifications and variations could be made thereto by those skilled in the art without departing from the scope of the invention set forth in the claims.

What is claimed is:

1. In a system in which an incoming signal is received into a receiver with an unknown timing error, the incoming signal being divided into time frames, and each time frame including a known portion, a method of determining a timing error of the incoming signal comprising:

receiving the incoming signal into the receiver;

locating the known portion within a time frame of the incoming signal in response to a clock signal generated within the receiver;

comparing the known portion having been located with an at least first order Taylor series stored representation, the at least first order Taylor series stored representation including a representation of the known portion and a representation of a derivative of the known portion;

determining the timing error of the incoming signal with respect to the clock signal in response to the comparing with the at least first order Taylor series stored representation; and locating a subsequent known portion within a subsequent time frame of the incoming signal in response to the clock signal generated within the receiver and in response to the timing error having been determined.

2. The method of claim 1 including filtering the timing error having been determined using an infinite impulse response filter.

3. The method of claim 1 wherein said locating of said subsequent known portion includes:

advancing said clock signal in the event said timing error is positive; and retarding said clock signal in the event said timing offset is negative.

4. The method of claim 1 wherein said locating of said known portion within said time frame of said incoming signal includes locating a synch pattern within said time frame of said incoming signal, and wherein said locating of said subsequent known portion within said subsequent time frame of said incoming signal includes locating a subsequent synch pattern within said subsequent time frame of said incoming signal.

5. The method of claim 4 wherein said receiving of said incoming signal includes receiving a remainder portion of said incoming signal within said time frame of said incoming signal.

6. The method of claim 5 further comprising:

transmitting, before said receiving of said incoming signal into said receiver, said incoming signal through a communications channel from a transmitter to said receiver.

7. The method of claim 6 wherein said transmitting includes transmitting said known portion during said time frame of said incoming signal and transmitting said subsequent known portion during said subsequent time frame of said incoming signal, said known portion of said incoming signal and said subsequent known portion of said incoming signal being transmitted as substantially identical portions of said incoming signal.

8. The method of claim 7 further comprising:

distorting, before said receiving of said incoming signal into said receiver, said incoming signal using said communications channel.

9. The method of claim 8 wherein said transmitting includes transmitting said incoming signal through air.

10. The method of claim 9 further comprising:

demodulating said remainder portion of said incoming signal.

11. The method of claim 1 wherein said comparing of said known portion having been located with said at least first order Taylor series stored representation comprises:

comparing said known portion having been located with said stored representation of said known portion; and comparing said known portion having been located, and having been compared with said stored representation of said known portion, with said stored representation of said derivative of said known portion.

12. The method of claim 11 wherein:

said comparing of said known portion having been located with said stored representation of said known portion includes determining a difference between said known portion having been located and said stored representation of said known portion; and said comparing said known portion having been located, and having been compared with said stored representation of said known portion, with said stored representation of said derivative of said known portion includes determining a product of said known portion having been located, and having been compared with said stored representation of said known portion, and said stored representation of said derivative of said known portion.

13. In a system comprising a clock circuit that generates a clock signal, and a receiver that receives an incoming signal with an unknown timing error relative to the clock signal, the incoming signal being divided into time frames, and each time frame including a known portion, an improvement comprising:

coarse acquisition means for locating the known portion within a time frame of the incoming signal, the locating means being coupled to the clock circuit and the locating being in response to the clock signal generated by the clock circuit;

processor means coupled to the coarse acquisition means, the processor means being for comparing the known portion, having been located by the coarse acquisition means, with an at least first order Taylor series representation, the at least first order Taylor series representation including a representation of the known portion, and a representation of a derivative of the known portion;

determining means for determining the timing error of the incoming signal with respect to the clock signal in response to the processor means; and clock adjusting means for locating a subsequent known portion within a subsequent time frame of the incoming signal in response to the clock signal generated by the clock circuit and in response to the timing error having been determined by the determining means.

14. The system of claim 13 wherein said processor means comprises means for comparing said known portion, having been located by said coarse acquisition means, with said representation of said known portion, and for comparing said known portion, having been located by said coarse acquisition means and having been compared with said representation of said known portion, with said representation of said derivative of said known portion.

15. The system of claim 14 wherein:

said means for comparing said known portion, having been located by said coarse acquisition means, with said stored representation of said known portion includes means for determining a difference between said known portion, having been located by said coarse acquisition means, and said stored representation of said known portion; and said means for comparing said known portion, having been located by said coarse acquisition means and having been compared with said stored representation of said known portion, with said stored representation of said derivative of said known portion includes means for determining a product of said known portion, having been located by said coarse acquisition means and having been compared with said stored representation of said known portion, and said stored representation of said derivative of said known portion.

* * * * *